United States Patent [19]
Schroeder et al.

[11] Patent Number: 6,089,623
[45] Date of Patent: Jul. 18, 2000

[54] FLUID COUPLING HAVING STEPPED SYNCHRONIZED THREADS

[75] Inventors: Fred Georg Schroeder, Grosse Ile; Joseph Nader, Jr., Port Sanilac, both of Mich.; Zhong Ping Zeng, Winsor, Canada

[73] Assignee: Ford Motor Company, Dearborn, Mich.

[21] Appl. No.: 09/175,702

[22] Filed: Oct. 20, 1998

[51] Int. Cl.[7] .................................................. F16L 19/028
[52] U.S. Cl. ........................................... 285/353; 285/355
[58] Field of Search ..................................... 285/353, 354, 285/386, 384, 391, 355; 411/437

[56] References Cited

U.S. PATENT DOCUMENTS

| | | |
|---|---|---|
| 786,516 | 4/1905 | Phelan ....................................... 285/354 |
| 2,163,212 | 6/1939 | Reddick . |
| 2,454,465 | 11/1948 | Leo et al. . |
| 2,477,677 | 8/1949 | Woodling . |
| 2,560,263 | 7/1951 | Wiegand et al. ........................ 285/354 |
| 2,562,294 | 7/1951 | Cahenzli, Jr. . |
| 2,587,544 | 2/1952 | Sneddon ............................... 285/391 X |
| 2,613,958 | 10/1952 | Richardson . |
| 2,701,149 | 2/1955 | Kreidel et al. ........................... 285/353 |
| 3,092,404 | 6/1963 | MacWilliam . |
| 4,060,264 | 11/1977 | Gajajiva . |
| 4,253,687 | 3/1981 | Maples . |
| 4,496,175 | 1/1985 | Morris . |
| 4,765,661 | 8/1988 | Fukushima et al. . |
| 4,796,928 | 1/1989 | Carlin et al. . |
| 5,503,187 | 4/1996 | Simmons et al. . |

*Primary Examiner*—Dave W. Arola
*Attorney, Agent, or Firm*—Raymond L. Coppiellie

[57] ABSTRACT

A fluid coupling is disclosed having a first pipe member and a second pipe member. The first pipe member has an externally threaded end with synchronized thread portions. The second pipe member is configured to be received within the first pipe member. The coupling further includes a nut slidably and rotatably fitted around the circumference of the second pipe. The nut is internally threaded with a pair of synchronized threaded portions for mating engagement with the threaded portions of the first pipe member.

11 Claims, 2 Drawing Sheets

FLUID COUPLING HAVING STEPPED SYNCHRONIZED THREADS

BACKGROUND OF THE INVENTION

1. Field of the Invention

The present invention relates generally to fluid couplings. More particularly, the present invention relates to a fluid coupling for joining two pipe members, the coupling including a swivel nut having stepped, synchronized threads.

2. Disclosure Information

Many different types of fluid couplings are know for joining together two pipe members through which a fluid flows. Spring lock couplings are one known type in which a radial spring disposed within a cage assembly securely holds one pipe member to a second. O-rings typically seal the connection between the pipes to prevent leaking.

Another type of coupling involves placing a flared end of one pipe member into a second and threading the pipes together with a male nut/female nut assembly. In this known coupling, the female nut is threaded over the male nut and rotated a number of times until tightened. The female nut can be secured directly to the pipe and the rotated to secure the connection, or the nut can rotate freely about the pipe so that the nut alone rotates. However, in this type of coupling, a large number of revolutions or turns of the nut must be made to securely tighten the pipes together. In the ever-decreasing engine compartment of an automobile, it may be difficult to rotate the nut many times. Furthermore, the ergonomics of rotating the nut a large number of time is undesirable.

Therefore, it would be advantageous to provide a coupling which overcomes the above-described problems. It is an object of the present invention to provide a coupling which reduces the number of rotations required to secure two pipe members together leak-free and still provide adequate holding strength between the pipes.

SUMMARY OF THE INVENTION

The present invention overcomes the disadvantages of the prior art by providing a fluid coupling, comprising a first pipe member and a second pipe member. The first pipe member has an externally threaded end, the threaded end having a first externally threaded portion of predetermined diameter extending a predetermined distance and a second externally threaded portion having a predetermined diameter greater than the diameter of the first threaded portion and extending axially adjacent thereto so as to form a stepped portion. The first and second externally threaded portions have identical thread pitch and are synchronized in the axial direction. The second pipe member has a first end of predetermined length and diameter which is received within the first pipe member. The second pipe member further includes a stepped portion disposed a predetermined distance from the first end, the stepped portion of the second pipe having a diameter greater than that of the first end.

The coupling further includes a nut slidably and rotatably fitted around the circumference of the second pipe. The nut has an internally threaded portion for mating engagement with the externally threaded end of the first pipe member. The internally threaded portion includes a first internally threaded portion and a second internally threaded portion, the first and second internally threaded portions having identical thread pitch and being synchronized in the axial direction. The first and second pipe members are joined together by rotating the nut over the first end portion of the first pipe such that the first and second externally threaded portions engage simultaneously the first and second internally threaded portions.

It is an advantage of the present invention that the pipe members can be joined together with fewer rotations of the nut member and still provide an appropriate amount of holding force to keep the pipes together.

It is an additional advantage that the coupling includes a rotatable nut member having synchronized threads which allow the pipe member to remain fixed while the nut is rotated to couple the members.

These and other advantages, features and objects of the present invention will become apparent from the drawings, detailed description and claims which follow.

BRIEF DESCRIPTION OF THE DRAWINGS

FIG: 1 is a perspective view of a coupling structured in accord with the principles of the present invention.

DETAILED DESCRIPTION OF THE PREFERRED EMBODIMENTS

Figure 1:
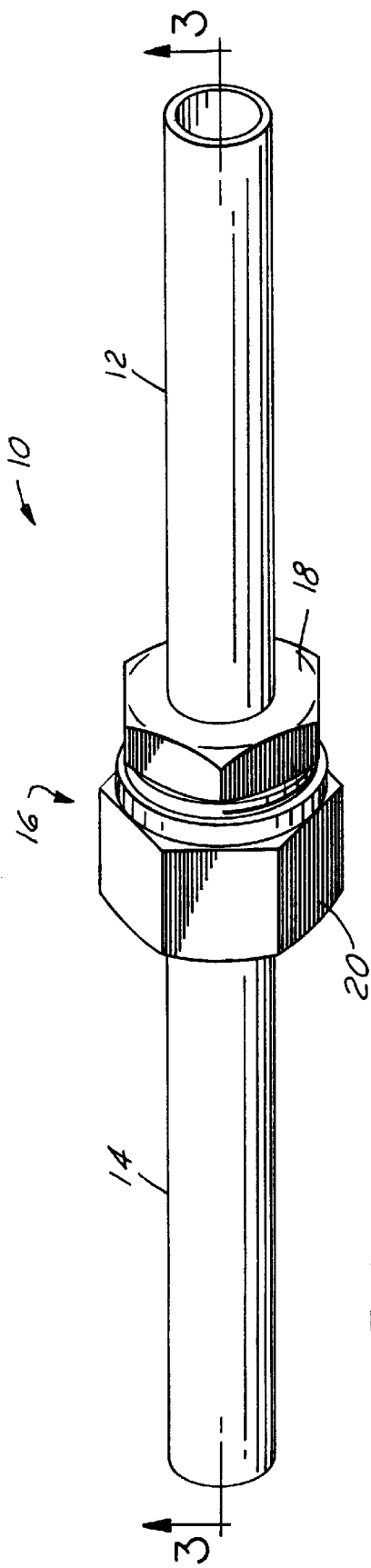

Referring now to the drawings, FIG. 1 is a perspective view of the fluid coupling assembly 10 of the present invention. The coupling 10 has particularly utility in fluid transport in automotive applications, such as air conditioning refrigerant lines, fuel lines, brake and power steering fluid lines and the like. The present invention works equally as well in other applications and the present invention is not meant to be solely limited to automotive applications. The coupling 10 includes a first pipe member 12 and a second pipe member 14 connected together by a joint assembly 16. The joint assembly 16 includes a male nut portion 18 engageable with a female nut portion 20.

Figure 3:
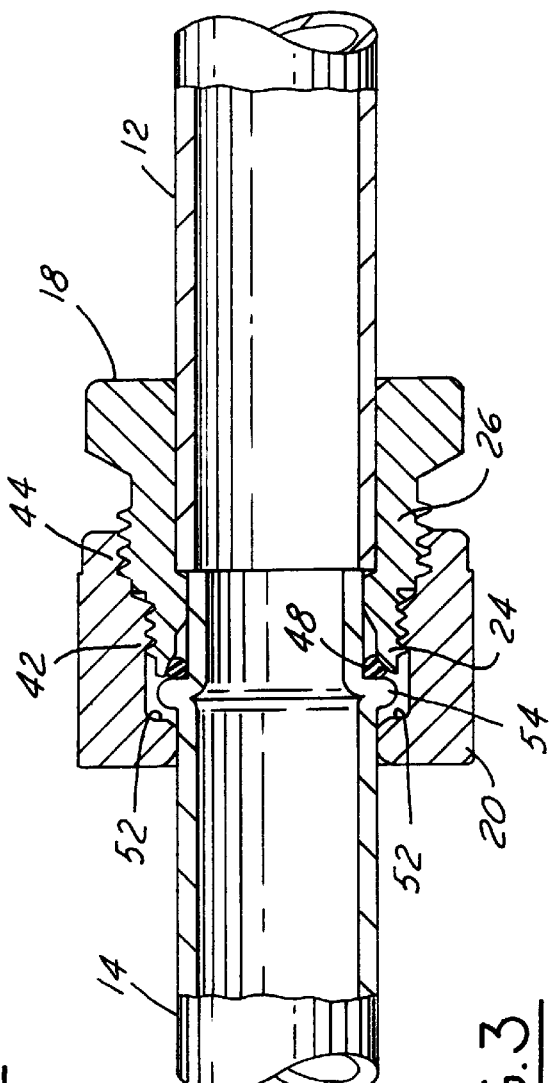
FIG. 3 is a cross-sectional view of the coupling of FIG. 1 taken along line 3—3 thereof.
Figure 2:
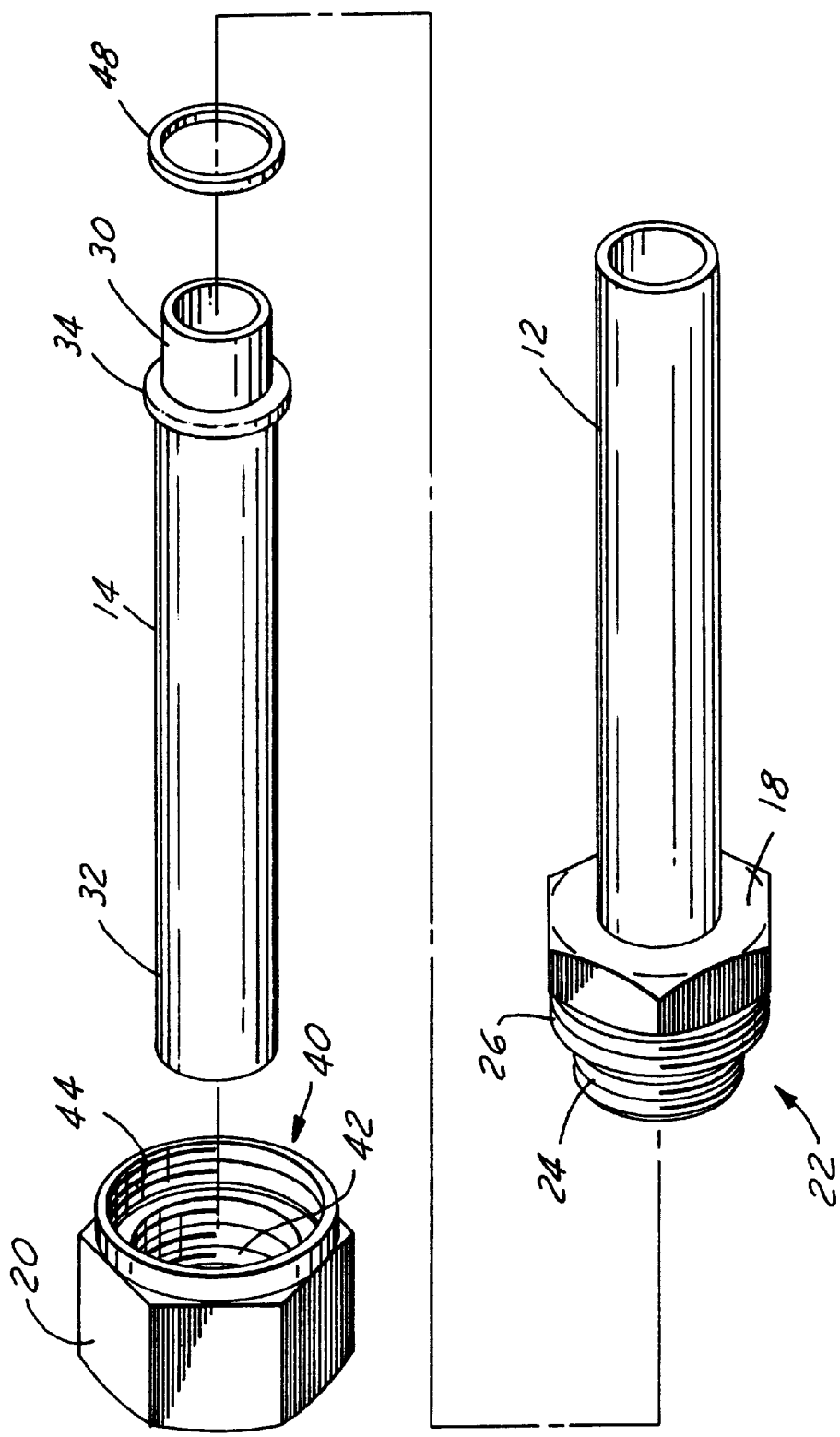
FIG. 2 is an exploded view of the coupling of FIG. 1.

Referring to FIGS. 2 and 3, the first pipe member 12 includes an externally threaded end portion 22. This portion 22 includes a first externally threaded portion 24 and a second externally threaded portion 26. These threaded portions 24, 26 can be formed integrally as part of the pipe member 12 or, as shown, be formed on a male nut member 18 which has been secured to the pipe member 12. The threads formed into each of the externally threaded portions 24, 26 are identical in thread pitch. Also, the threaded portions are aligned to be axially synchronized, the importance of which will be described below. As shown in FIG. 2, the threaded portion 24 extends further from the pipe member 12 than the threaded portion 26 and has a diameter less than that of the second threaded portion 26 to form a stepped configuration. This allows for easy alignment and insertion into the female nut member 20.

The second pipe member 14 is a generally elongated tubular member having a first end 30 and a second portion 32. The first portion has a predetermined length defined by shoulder 34 and a predetermined diameter. The diameter of first portion 30 is chosen so that the first portion 30 is received within the first pipe member 12 for fluid connection. The second portion 32 of second pipe member 30 has a greater diameter that the first portion. This also defines a stepped configuration.

A female nut 20, such as a swivel nut or sleeve nut, is slidably and rotatably disposed around the exterior surface of the second pipe member 32. The nut 20 is configured to matingly engage with male nut portion 18 such that a leak tight coupling is made when the portions are rotatably secured together. The nut 20 includes an internally threaded portion 40 which matingly engages the externally threaded portion of male nut 18. The internally threaded portion 40 of nut 20 includes a first internally threaded portion 42 and a second internally threaded portion 44. These internally threaded portions have identical thread pitch and are synchronized in the axial direction. Further, the first 42 and second 44 internally threaded portions are axially aligned. The first internally threaded portion extends a predetermined distance further in the nut than does the second internally threaded portion 44.

To join the first and second pipe members together, the pipe members 12, 14 are bought together such that the first end of the second pipe 14 is placed in the opening of the first pipe 12. The female nut 20 is slid over the male nut 18 so that the threaded portions all simultaneously engage. Specifically, the female nut 20 is slid over male nut 18 such that the first external threads 24 mating engage the first internal threads 42 while at the same time, the second external threads 26 engage with the second internal threads 44. The female nut 20 is rotated and all threads engage simultaneously. The male nut 18 is drawn into the female nut 20 by this rotation until the end of the male nut reaches the shoulder 34. A rear face 52 of the nut 20 engages a circunferential upset 54 formed on the surface of the second pipe member 14 at the shoulder 34. The upset prevents the second pipe member from pulling out of the joint after the joint has been tightened. FIG. 3 illustrates this relationship. By using a thread arrangement as described with a rotatable swivel nut, less rotation of the nut is required for an equal force to be achieved with a conventional nut arrangement. Additionally, the swivel nut allows for easy installation in many tight or hard to reach places since the nut is rotated about the pipe, and the pipe does not have to be rotated.

To prevent fluid leaks, a sealing device, such as O-ring 48 can be used at the shoulder 34 of the second pipe member 14. A circumferential upset 54 may be formed in the second pipe member as well to prevent axially movement of the swivel nut beyond a predetermined maximum distance.

Many other variations of the present invention will no doubt, occur to those skilled in the art. For example, the materials used in forming the pipe members or nut members can be steel, aluminum, or others. Furthermore, the number of threads formed in the nut members will depend on the amount of force required for a specific application. It is the following claims, including all equivalents, which describe the scope of my invention.

What is claimed is:

1. A fluid coupling, comprising;
   a first pipe member having an externally threaded end, said threaded end having a first externally threaded portion of predetermined diameter extending a predetermined distance and a second externally threaded portion having a predetermined diameter greater than the diameter of said first threaded portion and extending axially adjacent thereto so as to form a stepped portion;
   a second pipe member having a first end of predetermined length and diameter and configured to be received within said first pipe member and a stepped portion disposed a predetermined distance from said first end, the stepped portion of said second pipe have a diameter greater than that of said first end;
   said second pipe member having an upset circumferentially extending from a surface of said stepped portion by a predetermined distance; and
   a nut loosely and rotatably fitted around the circumference of said second pipe and having an internally threaded portion for mating engagement with the externally threaded portion of said first pipe member, said internally threaded portion having a first internally threaded portion and a second internally threaded portion, said first and second internally threaded portions being synchronized in the axial direction, said nut further including a rear face having an aperture therein, said aperture having a diameter greater than said stepped portion of said second pipe member and less than the diameter of said upset so that said upset prevents disengagement of said second pipe member from said first pine member after said nut is rotated over said first end portion of said first pipe.

2. A fluid coupling according to claim 1, wherein the first and second externally threaded portions of said first pipe member are synchronized in the axial direction.

3. A fluid coupling according to claim 2, wherein said first and second externally threaded portions have identical thread pitch.

4. A fluid coupling according to claim 3, wherein said first and second externally threaded portions engage simultaneously the first and second internally threaded portions.

5. A fluid coupling according to claim 1, wherein said first and second internally threaded portions have identical thread pitch.

6. A fluid coupling according to claim 1, wherein said externally threaded end portion of said first pipe member comprises a male nut secured to said first pipe member.

7. A fluid coupling according to claim 1, further including seal means disposed at said upset.

8. A fluid coupling according to claim 7, wherein said seal means is an O-ring.

9. A fluid coupling, comprising:
   a first pipe member having an externally threaded end, said threaded end having a first externally threaded portion of predetermined diameter extending a predetermined distance and a second externally threaded portion having a predetermined diameter greater than the diameter of said first threaded portion and extending axially adjacent thereto so as to form a stepped portion, the first and second externally threaded portions having identical thread pitch and being synchronized in the axial direction;
   a second pipe member having a first end of predetermined length and diameter and configured to be received within said first pipe member and a stepped portion disposed a predetermined distance from said first end, the stepped portion of said second pipe have a diameter greater than that of said first end;
   said second pipe member having an upset circumferentially extending from a surface of said stepped portion by a predetermined distance; and
   a nut loosely and rotatably fitted around the circumference of said second pipe and having an internally threaded portion for mating engagement with the externally threaded portion of said first pipe member, said internally threaded portion having a first internally threaded portion and a second internally threaded portion, said first and second internally threaded portions having identical thread pitch and being synchronized in the axial direction, said nut further including a rear face having an aperture therein, said aperture having a diameter greater than said stepped portion of said second pipe member and less than the diameter of said unset so that said upset prevents longitudinal movement of said nut along the length of said second pipe member toward said first pipe member, said first and second pipe members being joined together by rotating said nut over said first end portion of said first pipe such that said first and second externally threaded portions engage simultaneously the first and second internally threaded portions.

10. A fluid coupling according to claim 9, wherein said externally threaded end portion of said first pipe member comprises a male nut secured to said first pipe member.

11. A fluid coupling according to claim 10, further including seal means disposed at said upset.

* * * * *